Sept. 24, 1957   L. W. LEDGERWOOD, JR   2,807,442
MOMENTUM PELLET IMPACT DRILLING APPARATUS
Filed Jan. 29, 1952   2 Sheets-Sheet 1

Leroy W. Ledgerwood, Jr. Inventor
By W. O. Heilman Attorney

Sept. 24, 1957 L. W. LEDGERWOOD, JR 2,807,442
MOMENTUM PELLET IMPACT DRILLING APPARATUS
Filed Jan. 29, 1952 2 Sheets-Sheet 2

Leroy W. Ledgerwood, Jr. Inventor
By W. O. Heilman Attorney

United States Patent Office 2,807,442
Patented Sept. 24, 1957

2,807,442

MOMENTUM PELLET IMPACT DRILLING APPARATUS

Leroy W. Ledgerwood, Jr., Tulsa, Okla., assignor to Esso Research and Engineering Company, a corporation of Delaware Application January 29, 1952, Serial No. 268,882

4 Claims. (Cl. 255—61)

This invention concerns a novel method and apparatus for the drilling of bore holes in the earth. The drilling method of this invention is of particular application to drilling for petroleum oil. The invention concerns what may be called pellet impact drilling in which a plurality of hard, dense, spherical pellets are entrained in a high velocity fluid jet so as to be forcefully impinged against an earth formation to be drilled. The invention resides in the manner by which these pellets are caused to be continuously recirculated in the immediate vicinity of the drilling zone. In accordance with this invention means are provided to cause deflection and separation of the pellets from the return circulation of fluid so as to redirect the pellets into the fluid jet employed.

It has recently been discovered that a remarkably effective drilling action can be achieved by a basic innovation in drilling techniques. The copending patent application Serial No. 268,873, filed for Philip S. Williams, on January 29, 1952, entitled "Pellet Impact Drilling Method and Apparatus," sets forth the basic principles of this drilling technique. In accordance therewith a stream of fluid is pumped from the surface of the earth through a tubular member to a jet nozzle assembly suspended thereby in a bore hole. While a variety of jet nozzle assemblies may be employed, these assemblies are so arranged as to cause the forceful ejection of a directed high velocity jet of fluid. The jet assembly is of a nature to permit entrainment of a multitude of pellets in this fluid jet. Entrained in the fluid jet, the pellets attain a high kinetic energy so that on impingement against the bottom of the bore hole percussion and fracturing forces cause a drilling action. The pellets to be employed are smooth, non-abrasive, spherical pellets having a diameter of about ⅛ of an inch to one inch. Hard, tough metallic alloys are preferably employed.

In considering this basic drilling technique it becomes important to provide a suitable and effective manner of securing continuous recirculation of the pellets in the fluid jet. Thus means are required to carry pellets upwardly after impact and to permit the pellets to be re-entrained in the fluid jet. In this connection it would appear impractical to consider circulating the pellets through any substantial length of the bore hole. It is clearly of the greatest practical importance to enable recirculation of the pellets in the immediate vicinity of the drilling zone. This serves to conserve the energy required and to increase the effective density of the pellets in the drilling zone while permitting use of a smaller number of pellets.

In the patent application referred to, setting forth the basic principles of pellet impact drilling, one manner of securing the desired recirculation of the pellets is disclosed. This method requires configuration of the jet nozzle assembly so as to provide a gravity settling zone above the assembly, in which the pellets may separate from the drilling fluid so as to settle in a recirculation channel communicating with the fluid jet. This invention is in part directed to an improvement of this gravity separation technique, particularly in providing means to effectively employ momentum of the pellets for effective re-entrainment in the jet.

The basic principle employed in the method and apparatus of this invention is to provide a deflecting surface in the annular space above the jet assembly between the drill pipe and the bore hole. This deflecting device is so arranged as to effectively block passage of the pellets upwardly while permitting passage of drilling fluid and pulverized earth formation. Consequently the deflector serves to separate and at least in part, to redirect the pellets towards the entraining fluid jet for recirculation.

A wide variety of deflecting means may be employed in accordance with the principles of this invention. A variety of different embodiments of the invention are illustrated in the attached drawings in which:

Figure 1 diagrammatically illustrates in cross-sectional, elevational detail a pellet impact drill of the simplest form embodying the basic principles of this invention;

Figure 1:
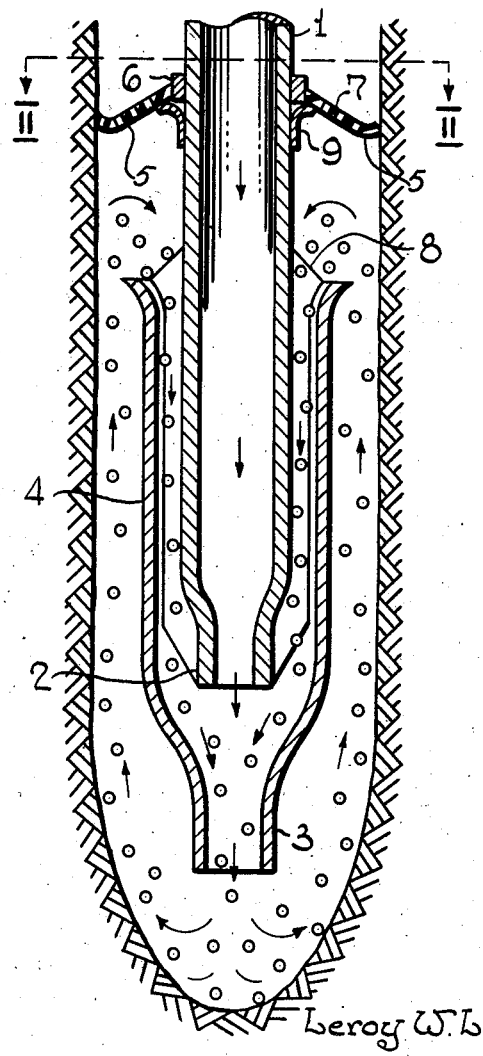

Referring first to Figure 1, an apparatus is illustrated in drilling position showing the basic principles of pellet impact drilling. The jet assembly shown is attached to a drill pipe 1 which extends downwardly into the bore hole illustrated so as to space the jet assembly connected thereto at a distance above the bottom of the bore hole. Fixed to the drill pipe 1 is a primary nozzle 2 adapted to permit ejection of a high-velocity, constricted jet of the fluid forced downwardly through the drill pipe. Arranged below and concentric with the primary nozzle 2 is a secondary nozzle 3 associated with a sleeve element 4 flaring upwardly and outwardly to encircle the primary nozzle 2. The sleeve thus provides an annular channel between the nozzle 2 and the sleeve 4. Three web members 8, may be fixed to the sleeve 4 and support 1 to hold the primary and secondary nozzles in fixed position.

In the operation of this apparatus, a multitude of pellets are introduced to the bore hole so as to be entrained in the fluid jet referred to and so as to follow the general circulatory paths indicated by the arrows. Thus when the drill is in operation, pellets dropping downwardly in the annular space provided by the sleeve 4 will be entrained in the fluid jet ejected by the nozzle 2 so as to be propelled from the secondary nozzle 3 entrained in the fluid jet. Thus a stream of jetted solid pellets will be forced downwardly through the secondary nozzle 3 to exert a cutting action having the general configuration illustrated in the drawing. The stream of drilling fluid will carry the pellets outwardly and upwardly through the annular space between the outside of sleeve 4 and the bore hole. When the pellets are carried above the upper termination of sleeve 4, a zone of decreased fluid flow is encountered by virtue of the greater annular space there provided. These pellets therefore have a tendency to settle from the fluid so as to drop downwardly into the sleeve arrangement provided for their recirculation.

Figure 2:
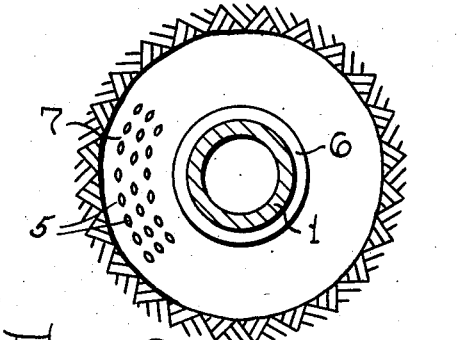
Figure 2 shows a cross-sectional detail of Figure 1 along the line II—II particularly showing the arrangement and perforations of the deflecting means provided.

The basic principle of this invention is to complement or replace the gravity separation of the pellets referred to by a deflecting means positioned somewhat above the re-entrainment channels provided for the pellets. Thus in Figure 1 and as illustrated in Figure 2, a deflector 7, which may constitute a perforated diaphragm fixed to a collar element 6, is employed. While the diaphragm may be metallic, it is particularly contemplated that the diaphragm constitute elastic material such as rubber impregnated fabric. This may be ribbed to maintain the configuration illustrated, although leaving a freely elastic periphery to accommodate variations in the size of the bore hole. A sufficient number and arrangement of perforations 5 are provided of a size to permit free passage of drilling fluid and pulverized earth formation but preventing passage of the pellets therethrough. As indicated, the diaphragm preferably has a diameter greater than the normal bore hole diameter with a flexible peripheral edge. Consequently on downward movement of the drill, the diaphragm will assume the general shape illustrated in Figure 1. A curved secondary deflector element 9, which may also be perforated, may be positioned as illustrated to aid in deflecting pellets downwardly. It will be noted that as a result of this construction the diaphragm operates as an expansible pellet deflecting means, operative to expand as required to block any normal variation in the gauge of the bore hole.

By virtue of the deflecting effect of the diaphragm described, it is apparent that the recirculation path of the pellets can be decreased below that obtainable by gravity separation techniques. Again, it is possible to employ greater fluid flows and drilling fluid of greater density if desired since the separation characteristics of the pellets in the drilling fluid need not limit the recirculation obtained.

It should be observed that many equivalents for the deflecting means provided in Figures 1 and 2 may be employed. In general any suitable deflecting means may be used providing passages, perforations, or slots through which drilling mud and pulverized earth may pass while preventing the passage and causing the downward deflection of pellets. Again for example, if desired, baffle surfaces may be employed to provide the function of deflecting means.

Figure 3:
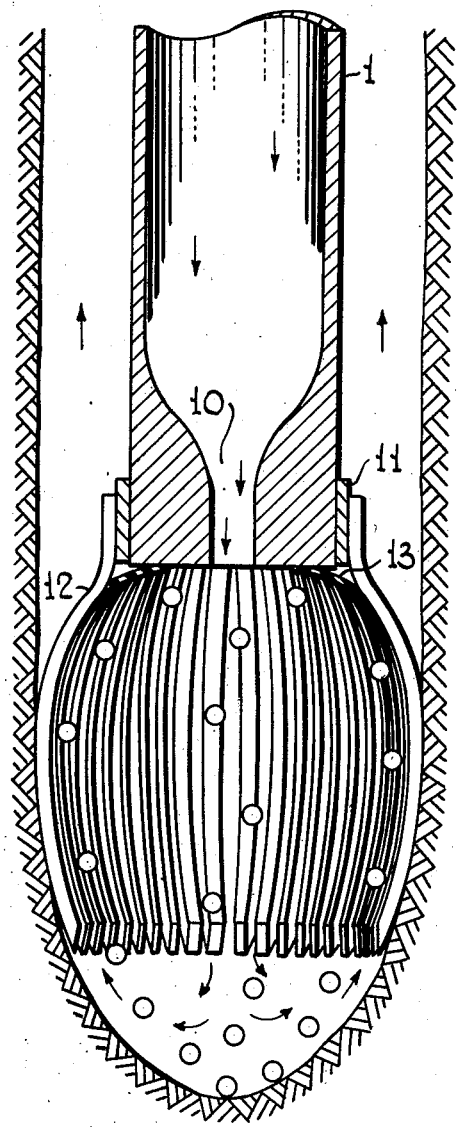
Figure 3 shows a different form of the invention employing spring-like web members to define a cage of a nature to permit the captive recirculation of the drilling pellets.

Referring now to Figure 3 another basic form of this invention is illustrated, employing a dependent shroud member formed by a plurality of spring-like extensions. In this figure, for simplicity, a single fluid jet nozzle 10 is illustrated, supported by a tubular member or drill pipe 1. A suitable collar 11 is fixed to some portion of the nozzle 10 or drill pipe 1 adjacent to but somewhat above the outlet of the nozzle. Fixed to this collar element 11 are a plurality of spring-like rods 12 which are arranged to curve downwardly and outwardly to lie along the wall of the bore hole, terminating with an inward bend at the end thereof. This configuration permits the spring-like elements to slide downwardly along the wall of the bore hole while permitting sufficient spring extension to accommodate normal variations in the gauge of the bore hole. As diagrammatically indicated, a sufficient number of these spring extensions 12 are employed so as to provide narrow slotted openings therebetween of a size preventing passage of drilling pellets upwardly therethrough. These slotted openings are of a nature, however, to permit passage of the drilling mud and pulverized earth upwardly through the annulus of the bore hole to the surface of the earth. Again a secondary deflector 13, constructed of rubber, for example, may be used to streamline the juncture of the spring elements and the collar element.

The operation of the apparatus of Figure 3 is essentially that described in conjunction with Figure 1. However, in the apparatus of Figure 3, gravity separation plays virtually no part in the recirculation of the drilling pellets. Thus pellets directed upwardly and outwardly by the drilling fluid are caused to contact the rod extensions 12 so as to be deflected therefrom inwardly and downwardly towards the jet nozzle 10. Consequently to a greater degree than in the apparatus of Figure 1, that of Figure 3 attains recirculation of the pellets by utilization of a cage-like deflecting means sharply restricting the recirculation path of the pellets.

Figures 4, 5:
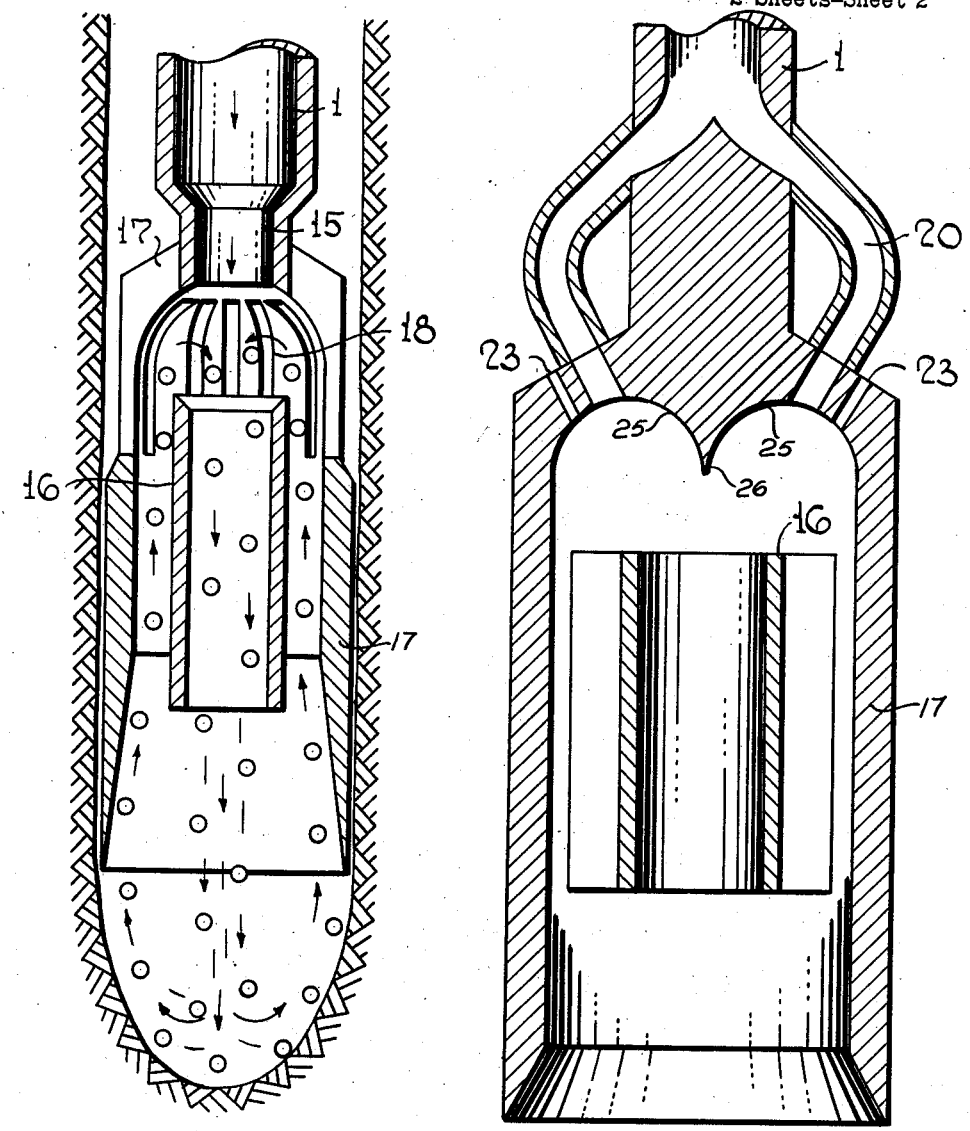
Figure 4 illustrates in cross-sectional, elevational detail an embodiment of the invention in which a rigid slotted shroud is employed to provide the deflecting pellet separation means.
Figure 5 illustrates a variation of the apparatus of Figure 4, illustrated in the same general manner, but including means to effectively redirect the pellets into the jet assembly so as to usefully employ the momentum of the pellets.

By virtue of the fact that pellet impact drilling methods may be employed to consistently cut a gauge size hole with little variation in size, it becomes practical to employ a fixed rigid shroud member as a recirculation means for the pellets. An apparatus of this character employing a rigid pellet recirculation shroud is illustrated in Figure 4. In this figure, the numeral 1 again designates the drill pipe supporting the drill in the bore hole. A primary nozzle 15 is attached to the lower termination of the drill pipe to form a high velocity jet of the fluid pumped therethrough. Suspended below the primary nozzle 15 is an elongated tubular secondary nozzle 16 concentric with the primary nozzle 15. Fixed to the nozzle 15, or alternatively to the drill pipe 1, is a downwardly dependent shroud 17 which is arranged to extend below the secondary nozzle 16. While not illustrated, for the purposes of simplicity, in construction the nozzle 16 may be supported by the shroud 17 by means of interconnected web elements. The shroud 17 preferably has the tapered lower termination shown to provide a lowermost edge of a knife-like character, so as not to impede upward recirculation of the pellets. A large number of slots 18 are cut through the upper portion of the shroud as shown in the drawing. These slots provide slotted passageways through which drilling mud and pulverized formation may pass but having an opening smaller than the pellets employed in drilling.

In the operation of the drill of Figure 4 the jet of fluid ejected through the primary nozzle 15 is directed toward and through the secondary nozzle 16. Pellets entrained in the fluid in passing through the secondary nozzle 16 are forced downwardly to cause the cutting pattern illustrated, by impact against the earth formation. The fluid causes outward and upward flow of the pellets in the direction indicated by the arrows. Fluid pumping rates are adjusted so that the diameter of the hole cut by these pellets is substantially that of the shroud. Consequently the pellets will be directed along the tapered termination of the shroud so as to be carried upwardly into the annular space between the shroud and the secondary nozzle 16. The curvature of the inner upper surface of the shroud causes these pellets to be redirected into the fluid jet in the space between the primary and secondary nozzles.

The apparatus of Figure 4 presents several advantageous features which should be emphasized. In securing effective pellet impact drilling it is essential that the fluid jet propelling the pellets be an optimum distance from the bottom of the bore hole. The apparatus of Figure 4 offers a practical solution to this problem since the lower termination of the shroud as it drops downwardly in the hole cut by the pellets serves to space the jet nozzle a suitable distance from the bottom of the bore hole. It is not necessary that any appreciable weight be placed on the shroud since it is only necessary to permit the "feel" of this placement by an operator of the drill. However, some weight may be applied to cause the edge of the shroud to break away any lip of material not directly removed by the pellets.

The primary and secondary nozzles employed in this and other embodiments of the invention are to be constructed according to certain definite principles. The primary nozzle is so designed as to cause an effective conversion of fluid pumping pressure available to the form of high velocity jetted flow. The secondary nozzle is to be designed so as to accommodate the fluid jet from the primary nozzle in admixture with pellets introduced to this jet. The function of the secondary nozzle is largely to provide an acceleration channel or nozzle causing effective entrainment and acceleration of the pellets in the fluid jet. Towards this end it is necessary that the diameter of the secondary nozzle be sufficiently greater than the diameter of the primary nozzle to accommodate the volume of pellets to be circulated through the secondary nozzle.

Referring now to Figure 5, a desirable modification of the apparatus of Figure 4 is shown providing means to effectively reverse the flow direction of recirculated pellets so as to utilize the momentum thereof.

In this form of the invention, a plurality of primary jets are employed in a manner to provide a dead space in a central area immediately above the secondary nozzle. Thus in Figure 5 a plurality of conduit channels 20 are provided arranged in a circular pattern around the axis of the drill. These channels 20 comprise primary nozzles through which fluid may be ejected when pumped through the drill pipe 1 and through the nozzles 20. It is apparent that any desired number of primary nozzles may be employed although it is preferred to utilize about three to five primary nozzles. It is apparent that the diameter of each of the primary nozzles thus provided must be reduced over the case in which only a single primary nozzle is employed. For illustrative purposes the shroud 17 is shown as having perforations 23, less than pellet diameter, at the upper portion thereof for the return of drilling fluid and cuttings to the surface of the earth. If desired, slots of the nature formerly described could be employed.

In operation, the plurality of jets provided by the jet nozzles 20 are directed inwardly and downwardly towards the secondary nozzle 16. This arrangement of inwardly directed jets aids recirculation of pellets by virtue of the fact that pellets returned upwardly along the inner surface of the shroud are more readily entrained by the inwardly directed jets of fluid. This is in part aided by the dead space between the circumferentially spaced jets and the dead space existing in the central portion of the apparatus immediately above the secondary nozzle 16.

In this form of the invention, it is a particular feature that the inner surface 25 of the shroud adjacent the jet nozzle is essentially semi-circular in vertical cross-sectional elevation. By this means pellets which are forced upwardly from the bottom of the bore hole along the inner surface of the shroud are forced along the curved surface referred to so as to be forcefully directed downwardly at the lip 26 thereof directly towards the secondary nozzle 16. The apparatus of Figure 5 therefore makes use of the return momentum of the pellets so as to minimize the acceleration forces required to be contributed by the fluid jet.

As described therefore, this invention concerns a pellet impact drilling method and apparatus in which recirculation of pellets in the drilling zone is aided by a mechanical deflector that effects positive separation of pellets from upwardly flowing fluid. As indicated, a wide variety of deflectors may be employed either of a rigid character or of an expansible character. The necessary characteristics of whichever deflector is chosen, concerns the provision of means for blocking essentially the entire cross-sectional area of the bore hole annulus while at the same time providing restricted passage-ways therethrough permitting the flow of drilling fluid and cuttings but preventing the passage of drilling pellets to cause the deflection and recirculation of the pellets to the jet nozzle or nozzles employed.

It should be observed that in this drilling technique, when pellets become sufficiently worn or fractured, the pellets will be carried upwardly through whatever deflector is provided so as to be carried from the bore hole along with cuttings in the drill fluid. At this time additional makeup pellets may be dropped down the drill string to maintain optimum drilling rates.

While not emphasized heretofore, it may be observed that the apparatus described is so constructed that prolonged life is obtainable. The spherical non-abrasive pellets employed can roll freely along all surfaces of the drill so that wear is minimized. No portion of the apparatus need be exposed to direct impact by jetted pellets. Heavy construction of all parts may be employed if desired without adversely affecting operation of the drill. It is particularly contemplated that rubber, ceramic, or other impact or wear resisting coating be applied to the portions of the apparatus contacted by the pellets.

It will be observed that in the drilling method described, rotation of the jetted pellet drill apparatus is not required but may optionally be employed.

What is claimed is:

1. An apparatus for drilling a bore hole in the earth by pellet impact comprising, in combination: a tubular support member extending downwardly into a bore hole, a first nozzle fixed to said support member at the lower termination thereof and in fluid communication therewith whereby to eject a downwardly directed high velocity jet of fluid from the bore of said tubular support member, a second nozzle of elongated tubular shape supported in fixed position below and spaced from said first nozzle and concentric therewith whereby to provide an acceleration conduit for pellets entrained in said jet of fluid, and a slotted blocking element fixed to said support member circumferentially about the support member, said blocking element including a downwardly extending sleeve portion extending below said second nozzle.

2. In an apparatus for drilling a borehole in the earth including a tubular support member suspended in the borehole which has a jet nozzle attached to the lower end thereof so as to receive a stream of fluid from the tubular support member and form a high-velocity jet of the fluid that circulates a plurality of pellets in the vicinity of the bottom of the borehole and impinges the pellets against the earth so as to pulverize the earth, the improvement which comprises a deflector element fixed to said support member above said jet nozzle and extending circumferentially about the support member to the wall of the borehole, said deflector element being perforated to separate the pellets following impingement from the fluid and pulverized earth particles and curved to redirect the pellets into the high-velocity fluid jet.

3. An apparatus as defined in claim 2 wherein the deflector element has a sleeve portion attached to and extending from the outer periphery thereof to below said jet nozzle.

4. An apparatus as defined in claim 2 in which the deflector element comprises a plurality of circumferentially arranged, downwardly dependent, outwardly bowed spring members, said spring members being spaced from one another so as to provide slots therebetween.

References Cited in the file of this patent

UNITED STATES PATENTS

| | | |
|---|---|---|
| 1,502,851 | Gale | July 29, 1924 |
| 2,007,844 | Baliko | July 9, 1935 |
| 2,072,627 | Zublin | Mar. 2, 1937 |
| 2,233,260 | Hawthorne | Feb. 25, 1941 |
| 2,332,267 | Sewell | Oct. 19, 1943 |